C. C. WALWORTH.
Connecting Steam, Gas, or Water-Pipes.

No. 166,735. Patented Aug. 17, 1875.

Witnesses.
Geo Gray
F. C. Hale

Caleb C. Walworth
by his attorney
F. P. Hale

UNITED STATES PATENT OFFICE.

CALEB C. WALWORTH, OF BOSTON, MASSACHUSETTS.

IMPROVEMENT IN CONNECTING STEAM, GAS, OR WATER PIPES.

Specification forming part of Letters Patent No. 166,735, dated August 17, 1875; application filed July 3, 1875.

*To all whom it may concern:*

Be it known that I, CALEB C. WALWORTH, of Boston, in the county of Suffolk and State of Massachusetts, have invented certain new and useful Improvements in Connecting Steam, Gas, or Water Pipes; and I do hereby declare that the following is a full, clear, and exact description thereof, which will enable others skilled in the art to which it pertains to make and use the same, reference being had to the accompanying drawing, and to the letters of reference marked thereon, which form a part of this specification.

Figure 1:
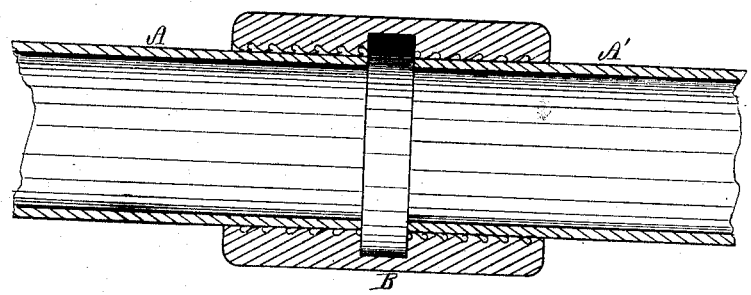
Figure 2:
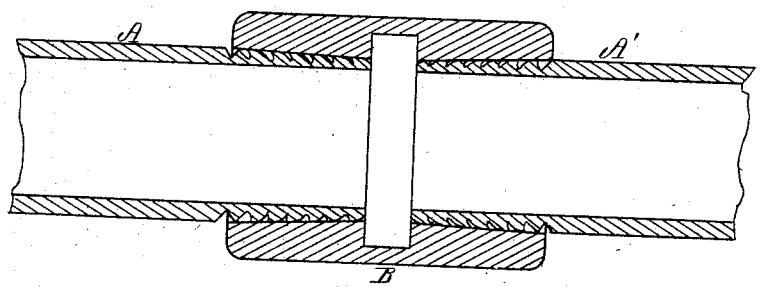
Figure 3:
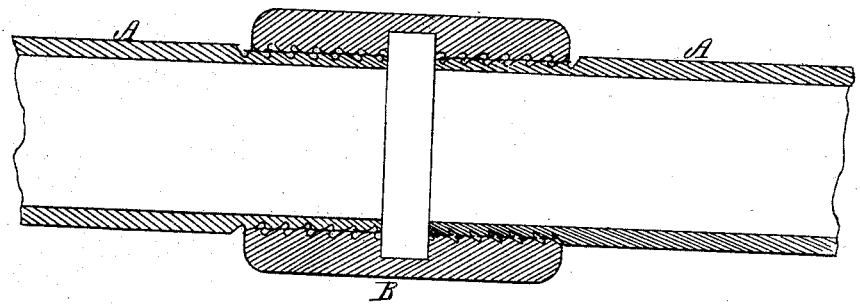

In such drawing, Figures 1 and 2 denote central and longitudinal sections of two pipes connected in accordance with my invention. Fig. 3 is another form of the invention, showing each surface of the parts to be connected as corrugated or grooved.

The object of my invention is to produce a strong and efficient joint for steam pipes, &c., whereby I am enabled to overcome sundry difficulties incident to the formation, fitting, and connecting of pipes, as ordinarily done, while I at the same time materially diminish the amount of labor and expense required in fitting and forming the connections.

My invention may be said to be an improvement upon that for which Letters Patent were granted to me on January 12, 1875, in which the surfaces of the pipes and parts to be connected were plain and milled to a standard uniform size; but such, while making a strong and durable connection, involved much labor and care in fitting the parts to make the connection.

In carrying out my present invention, I am enabled to dispense with such nicety and uniformity of fitting in adapting the parts to be connected, and at the same time obtain a joint which will stand a much higher pressure, or require a much greater force to separate the parts; and my invention consists in the peculiar mode of construction and connection of the parts, as hereinafter described and claimed.

In the said drawing, A and A' denote the two pipes to be connected, and B the connector or coupling.

In carrying out my invention, as shown in Fig. 1, I am enabled to employ pipes of much less thickness than is requisite under the ordinary method of forming and connecting them, (in which a screw-thread is cut in each of the surfaces to be united and the parts screwed together,) as I leave the surfaces of the pipes plain and form a series of fine annular grooves, corrugations, or spiral threads in the inner surface of the connector or coupling. In this case I make the diameter of the ends of the entering pipes slightly less than that of the bore of the coupling, or, in other words, corresponding with the internal diameter of the coupling diminished by one-half, or about one-half the depth of the grooves or threads of the coupling. The ends of these pipes are driven or forced into the coupling, whereby the outer edge or boundary of the threads (formed in the coupling) are upset or turned over into the grooves between them, and at the same time the pipes are more or less compressed, which effects a firm and strong union of the parts. If desirable, in order to insure a perfectly tight joint, plastic enamel, or any of the ordinary cements, may be employed in the usual manner.

In carrying out my invention, as shown in Fig. 2, I make the bore of the coupling B with a plain or uncut surface, and the outer ends of such bore of a diameter corresponding with the external diameter of the pipes. The diameter of the bore I prefer to make of a gradually-diminished size inwardly, but it may have a uniform diameter. The pipes in this case I make with corrugations or threads on their entering ends. These pipes, like those first mentioned, are to be driven into the coupling, and, like them, may have a luting of enamel or suitable cement applied thereto.

A still further method of carrying out my invention, as shown in Fig. 3, in which both the entering ends of the pipes, as well as the bore of the coupling, are formed with corrugations or threads, and the parts driven together and cemented as before.

From the above it will be seen that the joint I produce is a self formative or adjusting one; and that as the parts are swaged or driven together without rotative action, the teeth or corrugations are more or less upset or bent over by the entering part or parts, and thereby effect a perfect correspondence and union of the parts to be connected. In this way I am enabled to use pipes as they are formed, of an approximating size, without milling the ends, as heretofore required, when the parts are formed and united by an ordinary screw-connection.

Having described my invention, what I claim is—

The above-described improved process of connecting steam, gas, or water pipes, the same consisting in making one or both of the connecting-surfaces grooved or threaded, and swaging or driving together the parts thus formed to upset the grooved or threaded portion or portions, substantially as shown and described.

In testimony that I claim the foregoing as my own invention I affix my signature in presence of two witnesses.

C. C. WALWORTH.

Witnesses:
   F. P. HALE,
   F. C. HALE.